July 6, 1965
C. W. VOGT
3,192,964
METHOD AND EQUIPMENT FOR COMPACTING COMMINUTED MATERIALS OR THE LIKE
Filed Aug. 25, 1961
3 Sheets-Sheet 1
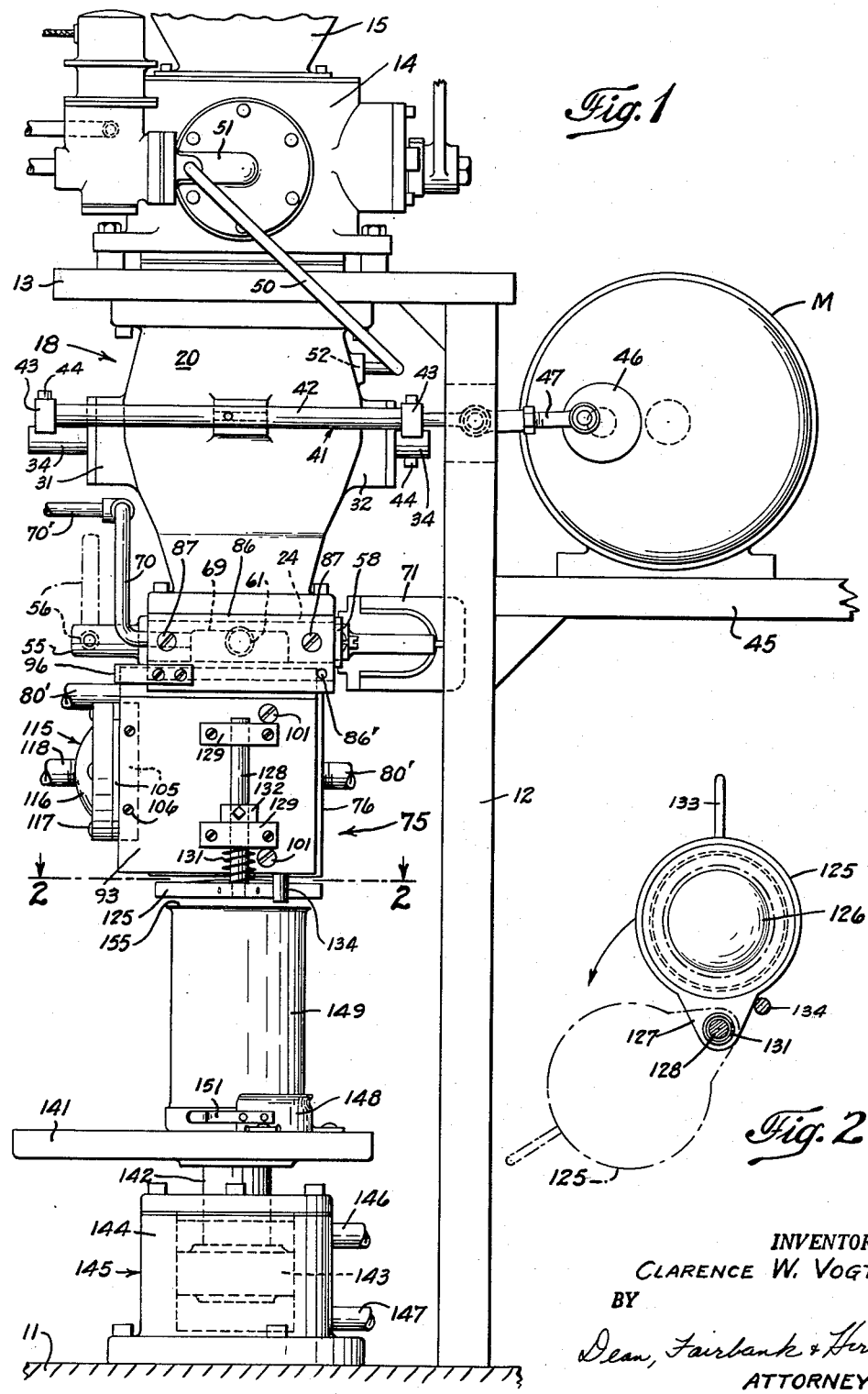
INVENTOR.
CLARENCE W. VOGT
BY
Dean, Fairbank & Hirsch
ATTORNEYS.

July 6, 1965
C. W. VOGT
3,192,964
METHOD AND EQUIPMENT FOR COMPACTING COMMINUTED
MATERIALS OR THE LIKE
Filed Aug. 25, 1961
3 Sheets-Sheet 2
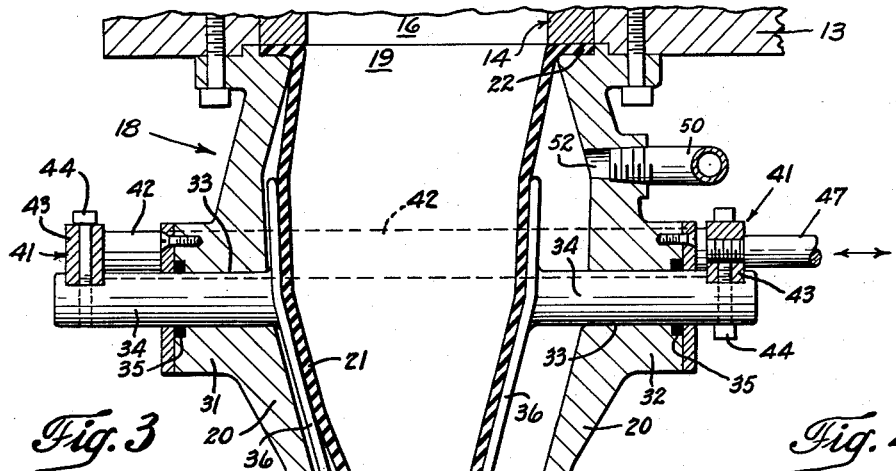
Fig. 3
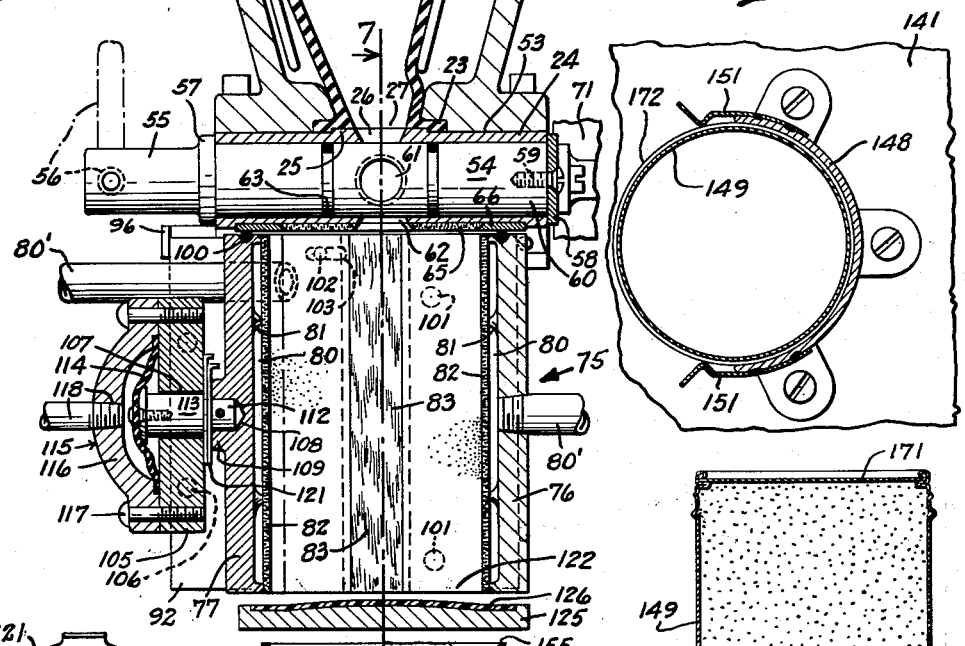
Fig. 4
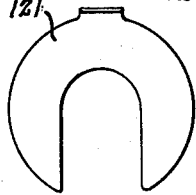
Fig. 5
Fig. 6
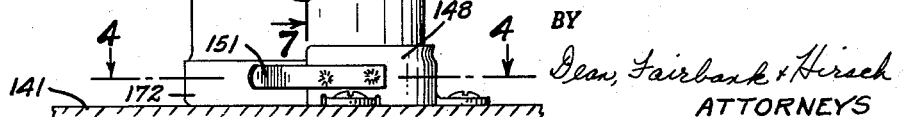
INVENTOR.
CLARENCE W. VOGT
BY
Dean, Fairbank & Hirsch
ATTORNEYS July 6, 1965 C. W. VOGT 3,192,964
METHOD AND EQUIPMENT FOR COMPACTING COMMINUTED
MATERIALS OR THE LIKE
Filed Aug. 25, 1961 3 Sheets-Sheet 3
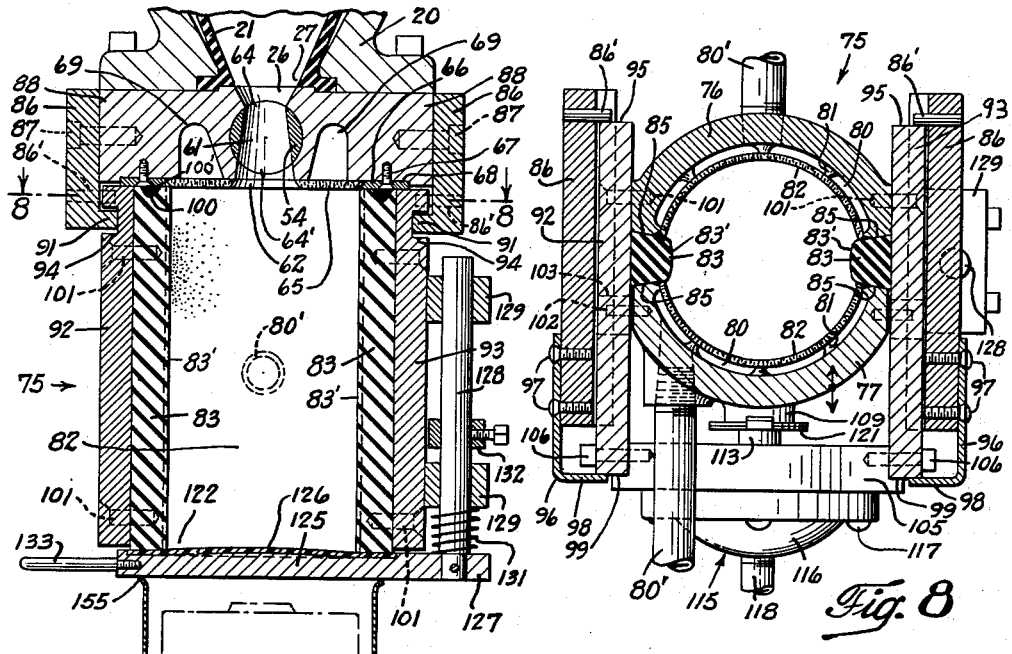
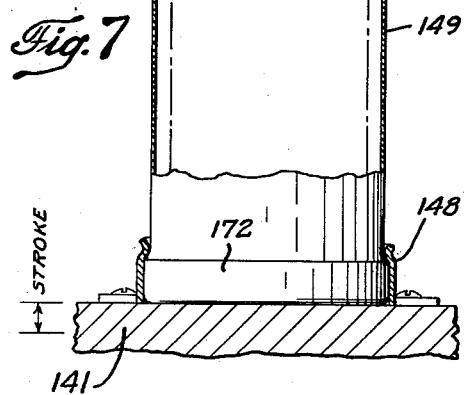
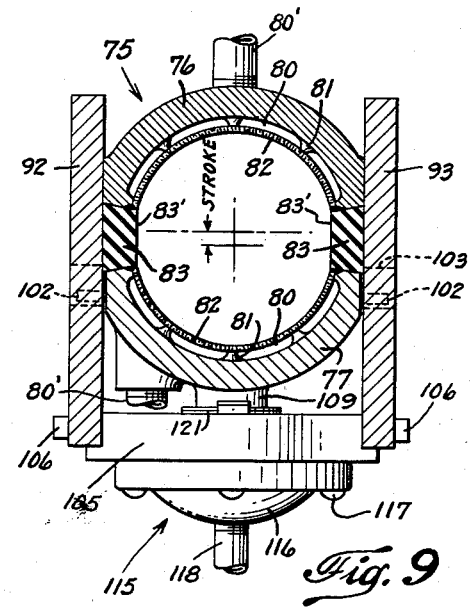
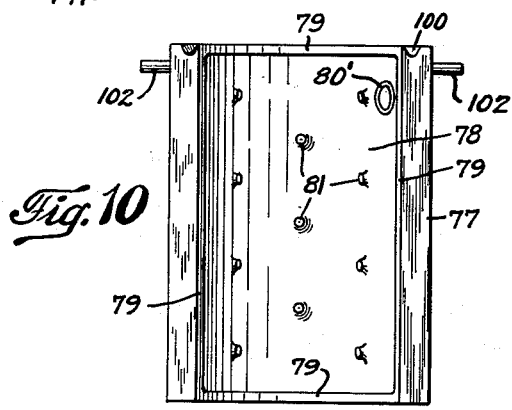
INVENTOR.
CLARENCE W. VOGT
BY
Dean, Fairbank & Hirsch
ATTORNEYS

United States Patent Office 3,192,964
Patented July 6, 1965

3,192,964
METHOD AND EQUIPMENT FOR COMPACTING COMMINUTED MATERIALS OR THE LIKE
Clarence W. Vogt, Box 232, Weston, Conn.
Filed Aug. 25, 1961, Ser. No. 133,979
15 Claims. (Cl. 141—12)

This invention relates to the art of packaging and more particularly to the filling of containers with predetermined weights of finely divided or comminuted material and/or mixtures which may be in the form of powder, grains, granules, particles and the like, flowable under gaseous pressure.

As conductive to an understanding of the invention it is noted that where a plurality of containers of a given size are to be filled with the same predetermined weight of such material, where the containers are filled by gravity flow to a height less than that of the container it is difficult to fill each container to exactly the same level with the result that the quantity and hence the weight of material from container to container varies appreciably.

Where the weight of material packaged is greater than the desired weight, it adds cost to the manufacturer and where it is less than the desired weight, the consumer will get less weight of material than is marked on the container, in violation of packaging laws.

Where each container is weighed as it is charged, the filling operation is slow and hence is extremely costly to the manufacturer.

It is accordingly among the objects of the invention to provide a relatively simple method and correspondingly simple equipment for dependably filling succeeding individual packages or receptacles such as containers with substantially identical weights of comminuted material at a relatively high rate of speed and without need for weighing each of the containers as it is being filled.

According to the invention a measuring chamber is provided, the volume of which may be readily and adjustably regulated. The measuring chamber has an inlet which is in sealable relation with a magazine containing a quantity of the comminuted material and a movable closure member is provided to seal the outlet end of the measuring chamber. With the outlet end of the measuring chamber in closed position, gas such as air under super-atmospheric pressure is applied to the material in the magazine to force sufficient material therefrom into the measuring chamber to completely fill the latter with such comminuted material in compacted form, the measuring chamber having means to vent the air entrained with the material forced thereinto, yet restrain escape of such material, so that the weight of the material in the measuring chamber will be based on the volume of such chamber since the entrained air has been substantially and uniformly vented.

After the measuring chamber has been charged, the outlet thereof is opened and the volume of the measuring chamber is then increased to permit rapid release of the compacted material therein into a container positioned beneath the open outlet, the slug of compacted material charging the container with substantially the exact weight of material desired based on the volume of the measuring chamber when it is charged.

After the outlet of the measuring chamber is opened, and the charge or slug dropped or deposited into the package or container, the mouth or material inlet of the container is closed or sealed. Thereafter the compacted slug of material may be only partially fluffed or refluidized without allowing any head space in the package or container since the fluffing or refluidizing gas is obtainable only from the captive air or gas surrounding the compacted enclosed slug. In some case this may occur, merely due to the usual subsequent motions imparted during the casing and transporting operations. With some materials shaking or vibration also may be employed without relying solely on subsequent "in transit" handling.

When the compacted slugs are deposited into semi-rigid cartons or flexible containers or pouches, the mouths and portions of the side walls of which have been temporarily shaped to receive the slug, the walls can be reshaped around the slugs, eliminating as much or little of the remaining gas as is desired, before closing of such container mouths.

According to one method of utilizing the equipment, the measuring chamber is initially charged after its volume has been increased and after it has been charged its volume is decreased to further compact the material charged thereinto, and thereupon after the outlet of the measuring chamber is opened the volume of the measuring chamber is increased for release of the compacted material.

In the accompanying drawings in which is shown one of various possible embodiments of the several features of the invention, FIG. 1 is a side elevational view of the equipment, FIG. 2 is a sectional view taken along line 2—2 of FIG. 1 showing the closure plate for the measuring chamber, FIG. 3 is an enlarged central longitudinal sectional view of the lower portion of FIG. 1 viewed in the same direction, FIG. 4 is a sectional view taken along line 4—4 of FIG. 3 showing the container positioning means, FIG. 5 is a plan view of a shim for adjusting the extended volume of the measuring chamber, FIG. 6 is a side elevational view partly broken away and in cross section of a filled container, FIG. 7 is a vertical sectional view taken along line 7—7 of FIG. 3 but showing the equipment in closed condition, FIG. 8 is a sectional view taken along line 8—8 of FIG. 7 showing the measuring chamber contracted, FIG. 9 is a view similar to FIG. 8 showing the measuring chamber extended, and FIG. 10 is a front elevational view of the inside face of a wall section of the measuring chamber with the porous liner removed.

Referring now to the drawings, the equipment desirably comprises a base plate 11 from which rises a standard 12, the upper end of which mounts a horizontal support plate 13.

Mounted on the support plate 13 is a blowing head 14, preferably of the type shown in Patent No. 2,879,922, dated March 13, 1959.

The blowing head has a hopper 15 secured thereto to receive a charge of finely divided or comminuated material. This material, in the manner fully described in said patent is forced by the application of gas under pressure from the outlet 16 of the blowing head.

As the blowing head per se is fully described in said patent, no further description thereof is deemed necessary.

A magazine 18 is secured to the undersurface of the support plate 13 and has its inlet 19 aligned with the outlet 16 of the blowing head 14.

The magazine 18 comprises a hollow casing 20 of rigid material in which a flexible liner 21 is positioned. As shown in FIG. 3, the casing 20 is of larger diameter at its central position than at its ends. The liner 21, which may be of rubber or similar material having like characteristics, has an annular flange 22 extending laterally outward from its upper end, which is seated in an annular recess at the upper end of the casing 20 and clamped against the adjacent end of the blowing head 14 to form a seal.

The lower end of the liner 21 also has an annular flange 23 extending laterally outward therefrom and seated in an annular recess at the lower end of the casing 20.

Secured to the flanged lower end of the casing 20 is a valve block 24 (FIGS. 3 and 7), the upper surface of which has an annular hub 25 rising therefrom through which a vertical bore 26 extends, the upper end of which defines the outlet port 27 of the magazine. The hub 25 seats in an annular recess in flange 23 dependably to clamp the flange in place and provide a seal.

The casing 20 is provided with diametrically opposed bosses 31, 32 which extend laterally outward at substantially the central portion of the casing. The bosses have aligned bores 33 extending therethrough, each of which mounts a slide rod 34 which is encompassed by an associated annular seal 35. The inner end of each slide rod 34 has a pusher plate 36 secured thereto adapted to react respectively against a portion of the side wall of the liner 21 on opposed sides thereof to effect lateral displacement of the material in the liner to prevent channeling of air forced therethrough.

Means are provided to reciprocate the pusher plates 36 in unison in the same direction.

To this end a yoke 41 is provided, the legs 42 of which straddle the casing 20 and the cross bars 43 of which are secured to the ends of the slide rods 34 as by screws 44. The yoke is illustratively reciprocated by a motor M mounted on support plate 45 secured to standard 12, said motor having an eccentric drive plate 46 operatively connected to one of the cross bars 43 of the yoke by linkage 47.

In order to provide equal pressure on both sides of the liner 21, a line 50 connects the gas inlet fitting 51 of the blow head to port 52 leading into casing 20. Desirably, two lines 50 and ports 52 (one of each not being shown) are provided for dependable equalization of pressure on the entire periphery of the liner 21.

The valve block 24 has a transverse bore 53 extending therethrough and at right angles to vertical bore 26 in which a valve rod 54 is rotatably mounted.

As shown in FIG. 3, the valve rod is cylindrical in cross section and has one end 55 thereof extending outwardly from bore 53 to which an actuating handle 56 is secured. The valve rod is restrained from axial displacement in bore 53 by a collar 57 secured thereto and abutting against one side of the block 24 and a plate 58 secured by screw 59 to the other end 60 of the rod and abutting against the other side of said block.

The rod 54 has a bore 61 extending therethrough at right angles to the axis thereof and adapted to be vertically aligned with the bore 26, in one position of rod 54 to provide communication between the outlet port 27 of the magazine and outlet port 62 of the valve and in a second position of rod 54 to cut off such communication, thereby closing the outlet port 27. To provide a seal, suitable O rings 63 encompass rod 54 on each side of bore 61.

As shown in FIG. 7, the upper portion of bore 26 defining the outlet port 27 desirably tapers inwardly so that its smaller diameter is substantially the same as that of one end 64 of bore 61.

The bore 61 tapers outwardly from the end 64 thereof to the end 64' thereof and such end 64' is adapted to be aligned with a circular opening which defines the outlet port 62.

As shown in FIGS. 3 and 7, opening 62 is formed in a rigid disc 65 of porous material such as sintered material which has its outer periphery bonded to an annulus 66 secured by screws 67 to the undersurface of valve block 24 in a recess 68 therein.

The porous disc 65 extends over the mouths of cavities 69 formed in block 24, said cavities being connected by lines 70 to a line 70'.

In order to insure discharge of material through the bore 61, a vibrator 71 is provided secured to the valve body 24 in any suitable manner.

Associated with the valve body 24 and depending therefrom is a variable volume measuring chamber 75 adapted to receive a predetermined quantity of material.

As illustratively shown in FIGS. 7 to 9, the chamber 75 comprises two elongated wall sections 76, 77, which can be of any desired contour, but which in the illustrative embodiment herein are arcuate, each occupying less than 180 degrees of arc in cross section. The inner surface 78 of each section has a peripheral rim 79 and said inner surface has a plurality of studs 81 extending outwardly therefrom. Secured at its periphery in sealed relation to the peripheral rim 79 of each of the sections is an elongated arcuate rigid porous plate 82 illustratively of sintered material, said studs 81 providing support for the plate inwardly of its periphery and forming a space 80 between the wall section and the porous plate, lines 80' leading into the spaces 80 of each section.

The two sections 76, 77 have interposed between their adjacent edges, elongated strips 83 of resilient material such as rubber or similar material having like characteristics, each of which, in its uncompressed form, occupies an included angle of approximately 25 degrees, each arcuate wall section illustratively occupying 155 degrees of arc.

As particularly shown in FIG. 8, the strips 83 are positioned between the adjacent side faces 85 of each of the wall sections 76 and 77. The inner surfaces 83' of the strips 83 in their slightly compressed condition may be flat as shown in FIG. 9 and when the wall sections 76 and 77 are moved together in the manner to be described, the strips 83 will be further compressed and their inner surface will become convex as shown in FIG. 8 and extend inwardly of the plane of the inner surfaces of porous plates 82.

It is to be noted that the strips are preferably not bonded to side edges 85 to facilitate replacement thereof depending upon the degree of resilience required. Therefore, in the illustrative embodiment shown, the strips are always compressed to retain them in place to maintain the continuous characteristics of the wall surface and to prevent any accumulation of material between the strips and the side faces 85, even when the measuring chamber is expanded to release the charge.

To mount the measuring chamber 75, a pair of side strips 86 are provided secured as by screws 87 to the opposed sides 88 respectively of the valve block 24 illustratively to extend parallel to valve rod 54.

The lower edge of each of the strips 86, which extends below the plane of the undersurface of block 24, has an inwardly extending flange 91 which serves as the supports for side plates 92, 93. As shown in FIG. 7, each of the side plates has a horizontal groove 94 in its outer surface adjacent its upper edge of height slightly greater than the thickness of flanges 91 which extend into said grooves. The plates 92, 93 are restrained from horizontal movement by means of pins 86' affixed to the strips 86 and abutting against the edges 95 of the plates 92, 93 and by means of L brackets 96 secured by screws 97 to the strips 86, the inwardly extending legs 98 of the brackets abutting against the edges 99 of the side plates 92, 93.

The measuring chamber 75 is positioned between the side plates 92 and 93. The wall section 76 of the measuring chamber is secured to the side plates 92, 93 as by screws 101 so that said wall section 76 remains in fixed position.

The wall section 77 has opposed studs 102 affixed at one end thereto and extending into elongated horizontal recesses 103 in the inner surfaces of plates 92, 93 to serve as guides for such section 77.

The upper edge of each of the wall sections 76, 77 has an arcuate groove 100 and an O ring 100' is positioned in such grooves 100 to provide a seal with respect to the annulus 66.

Means are provided to effect movement of the wall section 77 to vary the volume of the measuring chamber 75.

To this end, as illustratively shown in FIGS. 3, 8 and 9, a support strip 105 extends transversely between side plates 92, 93 and is secured to the ends 99 thereof as by screws 106.

The strip 105 has a bore 107 (FIG. 3) therethrough aligned with a cavity 108 in hub 109 in the wall section 77. Affixed at one end in said cavity as by a pin and extending through bore 108 is a stud shaft 112, the other end 113 of which is secured to the diaphragm 114 of an air actuator 115. As shown in FIG. 3, the actuator has a cover member 116 which is secured by screws 117 to strip 105 and which clamps the diaphragm 114 in place. The cover 116 has a port 118 to which a source of gas under pressure may be applied to react against the diaphragm to effect movement of shaft 112 and of wall section 77.

Means are provided to limit the movement of wall section 77. To this end, in the illustrative embodiment shown, a plurality of substantially U-shaped shims 121 are provided, one or more of which may be positioned to straddle the shaft 112 between hub 109 and strip 105 as shown in FIG. 3. Where more accurate adjustment is required, other equivalent means may be used.

Means are provided to close the bottom or outlet end 122 of the measuring chamber 75.

To this end, as shown in FIGS. 1 and 2, a disc 125 is provided of diameter greater than that of the maximum size of the outlet 122 of the measuring chamber 75, said disc having a pad 126 desirably of "Teflon" which has excellent release characteristics secured to its top surface which is slightly convex as shown and also of diameter larger than the maximum size of outlet 122. The disc 125 is mounted for pivotal movement in a horizontal plane and to this end, the disc has a lateral projecting ear 127 to which one end of a vertical rod 128 is secured. The rod extends freely through vertically aligned bearing blocks 129 secured to side plate 93. A coil spring 131 encompassing the rod 128 and reacting against ear 127 normally urges the disc 125 downwardly, a collar 132 secured to rod 128 limiting the downward movement thereof so that the upper surface of disc 125 will normally be spaced from outlet end 122 of the measuring chamber 75 as shown in FIG. 3.

The disc 125 may be pivoted into and out of alignment with the outlet 122 of the measuring chamber 75 by means of a handle 133 secured to the disc, a pin 134 depending from side plate 93 limiting the inward movement of the disc 125 so that it is properly aligned with such outlet 122.

Positioned beneath the measuring chamber 75 is a horizontal platform 141 which is supported by a rod 142 connected to a piston 143 slidably mounted in the cylinder 144 of an actuator 145. The cylinder 144 has ports 146, 147 leading into the chambers on each side of the piston 143 so that the piston may positively be raised or lowered as desired when a fluid under pressure is applied to the related port 146, 147.

The platform 141 has an arcuate stop 148 secured thereto to accommodate a portion of the lower end of a cylindrical container 149, spring arms 151 carried by said stop releasably clamping the container in position directly beneath the outlet 122 of the measuring chamber 75 and in axial alignment with the falling slug.

Operation

In the operation of the equipment, assuming that the blow head 14 and magazine 18 have been recharged with comminuted material as described in said Patent No. 2,879,922, air under pressure is admitted to port 147 of actuator 145 to raise the platform 141 and the container 149 positioned thereon.

The edge 155 of the container 149 as shown in FIG. 7 will abut against the undersurface of closure disc 125 and by reason of the slidable mount of the support rod 128 thereof in blocks 129, the disc 125 will be raised so that the pad 126 on its top surface will be clamped against the outlet end 122 of the measuring chamber 75 to seal the latter.

Such upward movement of the platform 141 reacting against the measuring chamber 75 will cause the latter to move up slightly so that its upper edge abuts against the periphery of annulus 66, the O ring 100' being further compressed.

This slight movement is permitted by reason of the slight play of flange 91 in groove 94, as shown in FIG. 7.

At this time the actuator 115 is not under pressure, so that by reason of the resilience of the srips 83, FIG. 9, the measuring chamber 75 is in its maximum volume position, shown in FIG. 9, determined by the number of shims 121 on shaft 112.

The blow head 14 is then subjected to the application of gas under superatmospheric pressure as described in Patent No. 2,879,922 to react on the material therein and in the liner 21 of magazine 18, the outlet port 27 thereof being closed by valve 54 which is in the posiiton shown in FIG. 3.

During such operation the motor M driving yoke 41 has been energized so that the pusher plates 36 are being reciprocated laterally to react against the flexible liner 21 to assist in filling same. Thus, the material therein will be displaced transversely to prevent channeling which would interfere with subsequent discharge of material from the magazine.

By reason of the lines 50 connected to the ports 52 of the magazine and to the gas inlet fitting 51 to which the source of gas under pressure is applied to the blowing head, the pressure on both sides of liner 21 is equalized to prevent excessive distortion and possible rupture of the liner when the comminuted material is forced thereinto.

The vibrator 71 mounted on the valve block 24 is also energized so that when the fill valve 54 is rotated to the open position shown in FIG. 7 to provide communication between the magazine 18 and the measuring chamber 75, any compacted material in the bore 61 of the fill valve 54 will readily be dislodged.

As a result of the opening of fill valve 54, since the material in the magazine 18 is being subjected to the application of gas under superatmospheric pressure, such material will be forced through the bore 61 into the expanded measuring chamber 75 to completely fill the latter, the material being compacted therein as the entrained gas will escape through the porous plate 82 and lines 80' to atmosphere and also through the porous annulus 65, cavities 69, lines 70, 70' to atmosphere.

At this time the fill valve 54 is rotated to the closed position shown in FIG. 3 and the blow pressure through fitting 51 to the blow head 14 is released and vented to atmosphere and the blow head is then recharged as set forth in said Patent No. 2,879,922.

The motor M operating the yoke 41 and pusher plates 36 and the vibrator 71 are then deenergized if desired or they may remain operating continuously without affecting the operation of the equipment.

At this time, gas under pressure is applied to the port 118. This causes the diaphragm 114 and shaft 112 to move inwardly thereby moving wall section 77 towards wall section 76 and further compressing the resilient strips 83 so that the inner surfaces thereof become convex as shown in FIG. 8, as the measuring chamber 75 is contracted to substantially cylindrical shape.

Such action causes a second compaction of the contents of the measuring chamber 75, additional entrained gas being driven out of the material through porous plates 82 and lines 80'.

The dimensions of the measuring chamber are so selected that when the latter is contracted to substantially cylindrical shape, as shown in FIG. 8, the diameter of the resultant compacted slug of material in the measuring chamber is less than the internal diameter of the container 149 and the height of the slug is less than that of the container as shown in broken lines in FIG. 7.

At this time a short spurt of gas under pressure is applied through lines 89' and through porous plates 82 and also through lines 70, cavities 69 and porous disc 65 to react against the side of the slug of material in the measuring chamber 75 to release the adhesion thereof to the porous plates 82 and against the top of the slug of material to release the adhesion thereof to porous disc 65, only the convex surfaces 83' of the strips now gripping such slug, such release action occurring without any dusting.

The platform 141 is now lowered by exhausting air pressure from port 147 and applying gas under pressure to port 146. As a result, the container 149 will be moved downwardly releasing the force exerted on disc 125, which will be moved downwardly by spring 131 so that it is spaced from the outlet end 122 of the measuring chamber 75. In addition, as the downward movement of disc 125 is limited by collar 132, it will be spaced from the open end 155 of the container 149 as shown in FIG. 3.

The release of the force exerted by disc 125 against the measuring chamber 75 will permit the latter to move downwardly slightly. However, the O ring 100' is not unsealed, but its pressure against the periphery of disc 66 is somewhat relieved.

The disc 125 is now pivoted laterally away from the outlet end 122 of the measuring chamber 75 and the mouth of the container 149 leaving an uninterrupted path therebetween.

Although the outlet end 122 of the measuring chamber 75 is now open and the top surface and the major area of the side of the slug therein have been released, as the measuring chamber 75 is still in contracted position, the convex surfaces 83' of the strips 83 will still extend inwardly and grip the compacted slug to retain the latter in the measuring chamber.

Thereupon, the gas under pressure applied to port 118 of actuator 115 is released and due to the transverse expansion of the compressed strips 83, the wall section 77 will move laterally away from wall section 76 enlarging the measuring chamber 75. Such movement, which is facilitated by the release of pressure by O ring 100' due to the downward movement of measuring chamber 75, will cause the inner surfaces of strips 83 to move outwardly away from the slug of material at right angles to the direction of movement of wall section 77, at least the same distance, to provide desired clearance without unsealing the opposed faces 85.

As a result, the slug of material will drop by gravity into the container 149 therebelow.

After the slug has been discharged, it is desirable to apply a short spurt of gas under pressure through line 70, cavities 69, through sintered disc 65 to clean the porous disc 65 and in addition at the same time a short spurt of gas may also be applied to lines 80' to clean the porous plates 82.

Since the diameter of the compacted slug is less than that of the container 149, it will readily fall therein and the container 149 can then be removed, an empty container put in its place and the operation repeated.

With the equipment above described, since the maximum volume of the measuring chamber 75 is determined by the amount of expansion thereof permitted by shims 121, based on the set volume, and depending upon the type of material being handled and the pressure under which it is forced into the measuring chamber 75, which are controllable and adjustable, a predetermined weight of material can be charged into the measuring chamber 75.

Thereupon, by reducing the volume of the measuring chamber 75 so that its diameter is less than that of the container 149, it can readily be discharged into such container while still maintaining the desired weight and container after container can be so filled with substantially no deviation in weight from container to container.

By reason of the fact that the extended volume of the measuring chamber is adjustable as by varying the number of shims 121, and/or varying the cross sectional dimension and characteristics of strips 83, containers of a given diameter can be charged with predetermined weights of material over a relatively wide range, and once the maximum volume of the chamber is set, successive containers filled, will each have substantially the same weight of material.

In those cases where the contracted measuring chamber will accommodate the desired weight of material in the compacted condition obtained by the blowing action alone, then the initial filling of the measuring chamber 75 can be when it is in contracted position and only opened to discharge the slug of material in the manner previously described.

As shown in FIG. 3, the slug of material when initially discharged into the container 149 is of diameter and height less than that of the container to ensure that the latter may be closed without particles of the material interfering with sift-proof closure of the container.

After the charged container 149 is removed, a closure plate C may be secured to the open end 155 thereof which is actually the bottom of the completed container 149. The top of the container, as shown in FIG. 6, may have a paper disc 171 secured thereto which is covered by a closure cap 172 screwed onto the top of the container.

As the container is turned right side up, the air or gas therein tends to move both into the material and to a position above the material provided such space is available after the material has fluffed up or refluidized to its loose or "normal" density. The jolting and shaking of the slug during container turning and handling loosens the compacted material and the air or gas imprisoned in the container around the slug re-fluffs or re-fluidizes the material causing it to approach its original density. However, since the slugs as compacted in the manner herein described, may be suitably proportioned to container size, this fluffing or refluidizing will be limited to the available space in the container and no later "settling" of the contents will normally occur to produce "slack fill" which is both wasteful of container material and cargo and shelf space and objectionable to consumer and governmental control agencies.

It is of course within the scope of the invention to have the closure disc retained against the outlet end of the measuring chamber by any suitable releasable clamping means and after the measuring chamber is filled and before discharge of the compacted slug, move the measuring chamber over a container. This method would be desirable where the container to be filled was substantially nonrigid.

The method and equipment above described permits simple and inexpensive standardization of cavities or measuring chambers for the desired weights of charges and fills to compensate for (a) variation in dimensions or thickness of cavity components, (b) variations in permeability of the gas releasing porous surfaces, and (c) minor variations in physical makeup of different lots of mixtures of materials; for example, moisture content, and granulation patterns, etc. The variations in the latter may also be compensated for in whole or in part, by adjusting the "blowing" pressure.

As many changes could be made in the above method and equipment and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A measuring chamber for comminuted material under the influence of a differential gaseous pressure, said chamber comprising a plurality of wall sections having adjacent edges, at least a portion of the inner wall surface of said chamber being porous to permit gaseous flow therethrough, resilient means interposed between said adjacent edges of said wall sections forming a chamber having a continuous side wall and openable ends, at least one of said wall sections being movable in direction at a right angle to a line extending between the ends of the chamber to vary the volume of said chamber and while said side wall maintains its continuous characteristics.

2. The combination set forth in claim 1 in which said resilient means is under compression and protrudes into said chamber, and upon movement of said wall section to increase the volume of the chamber, the inwardly facing surfaces of said resilient means will move outwardly at least substantially an equal distance.

3. The combination set forth in claim 1 in which a plate of porous material is positioned adjacent the inner surface of each of said wall sections and is spaced along at least its major portion from such inner surface, the periphery of each porous plate being in sealed relationship with the periphery of the associated wall section, each of said wall sections having a gas-tight port leading into such space.

4. The combination set forth in claim 1 in which said wall sections are arcuate in cross section and the resilient means interposed between adjacent edges of said wall sections comprise elongated strips in sealing relationship with said edges of said wall sections during said changes in volume.

5. The combination set forth in claim 4 in which the inwardly facing surface of each of said resilient strips when in compressed condition is convex in cross section along its length.

6. A measuring chamber for comminuted material, said measuring chamber comprising a plurality of wall sections having adjacent edges, resilent means interposed between said adjacent edges of said wall sections forming a chamber having a continuous side wall and open ends, a port leading into said measuring chamber, a porous member associated with said port to permit flow of gas therethrough yet restraining passage of material, at least one of said wall sections being movable in direction at right angles to a line extending axially between the ends of said chamber to vary the volume of said chamber, one end of said chamber defining the inlet thereto and the other the outlet, a magazine associated with said inlet, valve means controlling said inlet and a movable closure member associated with said outlet.

7. The combination set forth in claim 6 in which said magazine comprises a casing having a flexible liner therein, means reacting against opposed sides of said liner to effect transverse displacement of the material therein, and means substantially to equalize the pressure on opposed sides of said liner.

8. The combination set forth in claim 6 in which means are provided to charge said magazine with comminuted material under a differential gaseous pressure, whereby when the outlet end of said measuring chamber is closed by said closure member and the valve means is in open position, comminuted material will be forced into said measuring chamber to fill the latter in compacted form, the gas entrained with the material vent-through said port.

9. The combination set forth in claim 8 in which vibrating means are associated with said valve to facilitate the discharge of material therethrough.

10. Equipment of the character described comprising a magazine having an outlet port, a valve body secured to the bottom of said magazine and having a bore vertically alignable with said outlet port, a valve in said valve body controlling said bore, a measuring chamber comprising a plurality of wall sections having adjacent edges, resilient elongated strips interposed between said adjacent edges of said wall sections to form a chamber having a continuous side wall and open ends, means mounting said measuring chamber beneath said valve body in sealing relation thereto with one end of said measuring chamber adjacent said valve body, at least one of said wall sections being movable in direction at right angles to a line extending between the ends of the chamber to vary the volume thereof, and a movable closure member associated with the other end of said measuring chamber.

11. The method of charging a receptacle with comminuted material, which comprises charging a chamber with loose comminuted material and while so charging the chamber initially compacting the loose material, reducing the volume of such chamber to further compact such material, and thereafter increasing the volume of such chamber to release the material therein in compacted form into such receptacle.

12. The method of charging a receptacle with comminuted material, which comprises charging a closed chamber with such material by the application of gas under superatmospheric pressure against a supply of such material while venting gas from the chamber so that the material in the chamber will be substantially compacted, discontinuing the charging of such chamber and thereupon reducing the volume of the latter further to compact such material into such reduced volume chamber and then opening the lower end of the chamber and increasing the volume of such chamber, rapidly to release the material therein in such compacted form into such receptacle.

13. The method set forth in claim 12 in which gas under pressure is applied into the closed chamber when it is in its reduced volume condition to effect release between the side of the material and the adjacent wall of the chamber thereby facilitating discharge of the compacted material when the volume of the chamber is subsequently increased.

14. The method of charging a receptacle with comminuted material which comprises charging a chamber having a continuous vertical wall surface with such material, by the application of gas under superatmospheric pressure to a source of supply and venting the chamber as it is being charged, closing the charge off from its source of supply, applying gas under superatmospheric pressure to said chamber to effect release between the surface of the material and the adjacent wall of the chamber, and thereupon increasing the volume of such chamber while still maintaining the continuity of the vertical wall surface thereof to release the material therein in compacted form into such receptacle.

15. A measuring chamber for receiving comminuted material in a manner wherein the comminuted material is compacted as it is received within the measuring chamber, said chamber comprising a plurality of wall sections having axially extending adjacent edges, axially extending resilient strip interposed between said adjacent edges and compressively engaged by said wall section edges at all times during a material receiving and dispensing operation to define a tubular chamber body having an inlet end and a discharge end, and at least one of said wall sections being movable in a direction at right angle to the general longitudinal axis of said chamber body to facilitate the expansion of said chamber body and the resultant releasing of the compacted comminuted material therefrom while maintaining the continuity of said chamber body.

References Cited by the Examiner
UNITED STATES PATENTS

| | | | |
|---|---|---|---|
| 1,608,163 | 11/26 | Bronander | 53—124 |
| 2,112,872 | 4/38 | Wilson | 141—249 |
| 2,154,639 | 4/39 | Rohm et al. | |

(Other references on following page)

UNITED STATES PATENTS

| | | |
|---|---|---|
| 2,326,381 | 8/43 | Milligan et al. |
| 2,358,001 | 9/44 | Cross et al. _____ 141—249 |
| 2,381,802 | 8/45 | Booth et al. _____ 222—200 |
| 2,582,922 | 1/52 | Crowley et al. |
| 2,659,237 | 11/53 | Cuppett et al. |
| 2,879,809 | 3/59 | Vogt _____ 141—12 |
| 2,879,922 | 3/59 | Vogt _____ 222—189 |
| 2,935,233 | 5/60 | Vogt _____ 222—189 |
| 2,942,320 | 6/60 | Vos. |
| 2,946,357 | 7/60 | Hobbit et al. _____ 141—5 |
| 2,981,298 | 4/61 | Vogt _____ 141—5 |
| 3,056,166 | 10/62 | Weinberg. |

LAVERNE D. GEIGER, *Primary Examiner.*

LOUIS J. DEMBO, *Examiner.*